No. 879,339. PATENTED FEB. 18, 1908.
H. H. WABERS.
SEED PLANTER.
APPLICATION FILED JUNE 22, 1906.

Fig. 1.

Witnesses
Fred Palm
Bernard C. Roloff

Inventor
Henry H. Wabers
By Whistler, Fowler, Smith, Rittenhouse
Attorneys

UNITED STATES PATENT OFFICE.

HENRY H. WABERS, OF RACINE, WISCONSIN.

SEED-PLANTER.

No. 879,339. Specification of Letters Patent. Patented Feb. 18, 1908.

Application filed June 22, 1906. Serial No. 322,818.

*To all whom it may concern:*

Be it known that I, HENRY H. WABERS, a citizen of the United States, residing at Racine, in the county of Racine and State of Wisconsin, have invented certain new and useful Improvements in Seed-Planters, of which the following is a specification, reference being had to the accompanying drawing, forming a part thereof.

This invention relates more particularly to the seed measuring and dropping mechanism and its main objects are to accurately measure and to drop a certain quantity of seeds at predetermined intervals; to take the weight of the seed contained in the seed hopper or receptacle off from the feed wheel and to facilitate the operation of said wheel; to prevent the clogging and binding of the feed wheel, to insure the filling of the seed pockets before they are brought opposite the feed opening, and generally to improve the construction and operation of devices of this class.

It consists in certain novel features of construction and in the peculiar arrangement and combination of parts as hereinafter particularly described and pointed out in the claims.

In the accompanying drawing like characters designate the same parts in the several figures.

Figure 2:
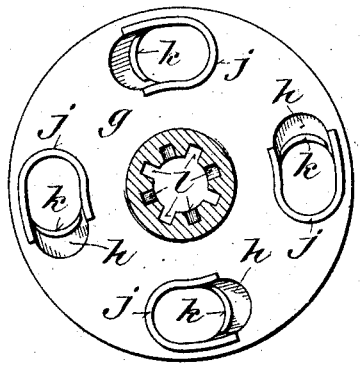
Figure 3:
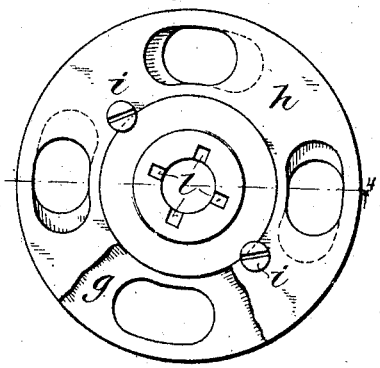
Figure 5:
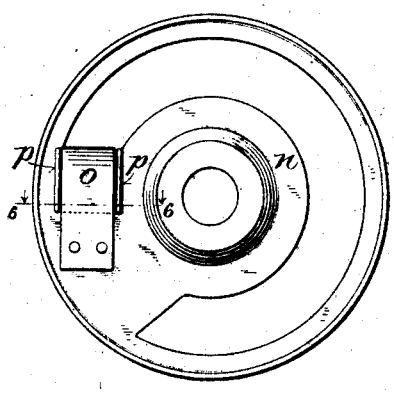
Figure 4:
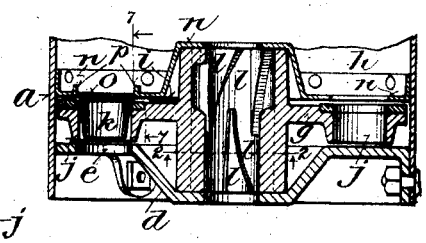
Figure 7:
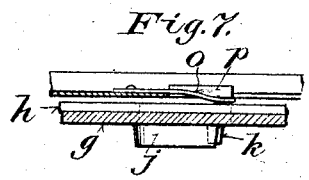
Figure 6:
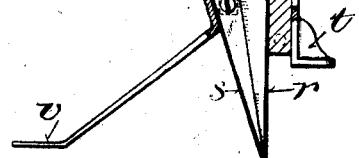

Figure 1 is a side elevation and vertical medial section of a hand planter embodying the present invention; Fig. 2 is an inverted plan view on an enlarged scale of the feed wheel, the hub of which is shown in cross section on the line 2, 2, Fig. 4; Fig. 3 is a plan view of the feed wheel; Fig. 4 is a vertical section of the feed wheel on the line 4, 4, Fig. 3, and of associated parts of the planter; Fig. 5 is a plan view of the guard and cut-off which are located just above the feed wheel; Fig. 6 is a cross section of the cut-off on the line 6, 6, Fig. 5, and Fig. 7 is a section on the line 7, 7, Fig. 4 of the cut-off and a part of the feed wheel.

For the purpose of illustration the seed measuring and dropping mechanism constituting the principal feature of the present invention is shown as embodied in a hand planter, although with little or no modification such mechanism may be incorporated in other kinds of planters.

Referring to the drawing, and particularly to Fig. 1, $a$ is a seed hopper or receptacle preferably made for hand planters in cylindrical form of sheet metal. It is provided with a removable cover $b$ having a central aperture for the passage through it of the stem $c$ of the handle by which the planter is operated. The bottom $d$ of the seed receptacle is formed with a feed opening $e$ and with a depressed or recessed central portion which is centrally perforated for the passage of the reciprocating rod $f$ which is attached to the lower end of the handle stem $c$.

The feed wheel is composed of a circular disk $g$ and an annular plate or disk $h$ adjustably secured thereon by screws $i$, as shown in Figs. 2, 3 and 4. These disks have corresponding elongated openings therein, and the disk $g$ is formed on the under side with depending U-shaped flanges $j$ partially surrounding the openings therein, while the disk or plate $h$ is formed on the under side at one end of the openings therein with flanges $k$ which fit between the sides of the flanges $j$ and form therewith adjustable seed pockets. The disk $g$ has a central hub which bears at its lower end in the central depression or recess of the bottom plate $d$ and through which the rod $f$ passes. The bore of this hub is formed with intersecting cam grooves $l$ with which a cross-pin $m$ or projections from the rod $f$ engage, and are so shaped and arranged that the reciprocation of said rod will turn the feed wheel intermittently and bring the seed pockets therein, one after another, over and into register with the feed opening $e$.

A shield $n$ is secured in the seed receptacle $a$ above and close to the feed wheel, and is bent upwardly or recessed on the under side at the center to receive and form a bearing for the upper end of the hub of the disk $g$, which is thus rotatably confined between said shield and the bottom plate $d$. The shield is centrally perforated and serves as a guide for the rod $f$ which passes through it, and as shown in Fig. 5, it is cut away or formed with a segmental opening corresponding with the path described by the seed pockets so as to permit said pockets to be completely filled with seeds in their passage along said opening.

A cut-off spring $o$ is attached to the shield $n$ over the opening $e$ and is bent downwardly at its free end close to the feed wheel so as to scrape or wipe the excess seeds therefrom as the pockets are carried under it into register with the opening $e$. On each side of the cut-off spring $o$ the shield is formed with upturned guards $p$ which prevent the seeds contained in the seed receptacle from working underneath said spring.

The shield $n$ covering the greater part of the feed wheel supports the seed contained in the hopper or receptacle $a$ above it, thereby taking the weight of the seed off from it and facilitating its operation. The rim of the shield extending over the periphery of the feed wheel prevents sand and broken seeds from working through the joint or space between it and the surrounding wall of the hopper or receptacle, and thereby clogging and interfering with the operation of the wheel.

The planter is provided with the usual or any suitable seed conveyer or duct $q$ attached to the bottom plate $d$ and terminating at its lower end in a fixed jaw $r$ and a jaw $s$ hinged thereto by which openings are made in the ground and the seeds are deposited therein. The bottom plate $d$ with the seed conveyer or duct $q$ and the jaws at its lower end, are removably attached to the hopper or receptacle $a$ so as to afford easy access to the feed wheel. The seed conveyer or duct $q$ is provided at its lower end with a vertically adjustable foot or gage $t$ which determines the depth or extent of penetration of the jaws into the ground. The hinged jaw $s$ is held normally closed by a spring $u$ and is provided with a bracket or toe piece $v$ for opening the jaws when the bracket or toe piece is brought into contact with the ground and the handle of the planter is swung forward.

The handle stem $c$, which may be made of wood, is preferably square or of angular shape in cross section, and is held in place and prevented from turning by a guide $w$ in the upper part of the hopper or seed receptacle $a$. Above and below this guide the stem is provided with pins or lugs $x$ which limit the endwise movement of the handle and rod $f$ in the hopper $a$ and feed wheel. The bottom plate $d$ of the seed receptacle, the disk $h$ of the feed wheel, and the shield $n$ as herein shown and described, may be conveniently and economically stamped from sheet metal.

The planter operates as follows: The hopper or receptacle $a$ being supplied with seed, the operator grasping the handle with one hand inserts the jaws into the ground at every step or at the desired intervals. With the insertion of the jaws into the ground a hole is formed for the seed and the weight of the planter being taken off from the handle, the rod $f$ is thrust downwardly through the feed wheel thereby turning said wheel forward an eighth of a revolution according to the formation of the cam grooves $l$, as shown in the drawing. The jaws being inserted in the ground as far as the foot or gage $t$ permits, the planter is swung forward by the operator and the bracket or toe piece $v$ being brought into contact with the ground opens the jaws, depositing in the hole made thereby the seed which has been previously dropped by the feed wheel into the conveyer or duct $q$. In lifting the planter preparatory to making another hole in the ground and dropping seed therein, the rod $f$ is drawn upwardly through the feed wheel, the cross pins or projections $m$ by engagement with the cam grooves $i$ turning it another eighth of a revolution forward, carrying the next seed pocket underneath the cut-off spring $o$ into register with the feed opening $e$, and dropping the seed contained in said pocket into the conveyer or duct $q$ in readiness to be discharged therefrom when the jaws are again opened as above explained.

The cam grooves may be formed in the rod $f$ to engage projections in the hub of the feed wheel with the same result, and said grooves may be so shaped and arranged as to turn the feed wheel a quarter instead of an eight of a revolution; in short, various changes in the details of construction and arrangement of parts may be made without materially affecting the operation of the planter and without departing from the principle and intended scope of the invention.

I claim—

1. In a seed planter the combination of a seed hopper or receptacle having a feed opening in the bottom, a feed wheel rotatably held in the lower part of said receptacle and having a number of seed pockets, and a reciprocating actuating rod working axially in a central opening in said wheel, one of said parts having a circular series of intersecting cam grooves and the other part a projection engaging said grooves and adapted as said rod is reciprocated to turn said wheel intermittently in one direction and bring said pockets one after another into register with said feed opening, substantially as described.

2. In a seed planter the combination of a seed receptacle having a feed opening in the bottom, a feed wheel rotatably held in the lower part of said receptacle and having a number of seed pockets and a series of intersecting cam grooves in the bore of its hub, and a reciprocating actuating rod having a projection adapted by engagement with said grooves to turn said wheel intermittently in one direction and to bring said pockets one after another into register with said feed opening, substantially as described.

3. In a seed planter the combination of a seed hopper or receptacle having a feed opening in the bottom, a feed wheel rotatably held in the lower part of said hopper or receptacle over said feed opening and composed of adjustably connected disks each having a circular series of openings therein, one disk having depending U-shaped flanges around the openings therein and the other disk having at one end of the openings therein depending flanges forming with said U-shaped flanges, adjustable seed pockets, and means comprising a reciprocating rod for turning said wheel intermittently in one direction to bring said pockets one after another into register with said feed opening, substantially as described.

4. In a seed planter the combination of a seed hopper or receptacle having an upwardly projecting hub and a feed opening in the bottom, a feed wheel having a circular series of seed pockets arranged to register with said feed opening, a shield covering the rim and central portion of said wheel and having a recess in the under side which receives said hub and forms a bearing therefor and a curved opening through which all the seed pockets except that in register with the feed opening communicate with said hopper or receptacle, a cut-off attached to said shield opposite the feed opening, and means for intermittently turning said wheel so as to bring said pockets one after another into register with the feed opening under the cut-off, substantially as described.

5. In a seed planter the combination of a seed hopper or receptacle having a feed opening and a central recess in the bottom, a shield secured in said hopper or receptacle and having a central recess on the under side, and a feed wheel the hub of which is rotatably confined in the recesses of said hopper or receptacle and shield, said wheel having a circular series of seed pockets, and a reciprocating rod working in the bore of said hub, one of the parts having intersecting cam grooves and the other a projection engaging therewith and adapted to turn said wheel intermittently to bring said seed pockets one after another into register with said feed opening, substantially as described.

6. In a seed planter the combination of a seed hopper or receptacle having a feed opening in the bottom, a feed wheel rotatably held in the lower part of said hopper or receptacle and having a circular series of seed pockets, a reciprocating rod working axially in said wheel, one of said parts having a circular series of intersecting cam grooves and the other a projection engaging therewith and adapted to turn said wheel intermittently in one direction to bring said seed pockets one after another over said feed opening, a cut-off arranged over said feed opening adjacent to the upper face of said wheel, a handle having a squared stem connecting it with said reciprocating rod and provided with stops, a squared guide for said stem in said hopper or receptacle between said stops, and a seed conveyer or duct attached to the lower end of said hopper or receptacle and terminating at its lower end in downwardly converging jaws, one of which is hinged to the other and held normally closed by a spring, substantially as described.

7. In a seed planter the combination of a seed hopper or receptacle having a feed opening in the bottom, a feed wheel rotatably held in the lower part of said hopper or receptacle over said feed opening and composed of adjustably connected disks each having a circular series of openings therein, one disk having depending U-shaped flanges around the openings therein and the other disk having at one end of the openings therein depending flanges which are curved oppositely to and form with said U-shaped flanges adjustable seed pockets of greater depth than the combined thickness of said disks, a cut-off located above said wheel opposite said feed opening, and means for turning said wheel intermittently to bring said pockets one after another into register with said feed opening below said cut-off, substantially as described.

In witness whereof I hereto affix my signature in presence of two witnesses.

HENRY H. WABERS.

Witnesses:
BERNARD C. ROLOFF,
JOHN H. HURLEY.